United States Patent [19]

Houck et al.

[11] Patent Number: 4,509,244
[45] Date of Patent: Apr. 9, 1985

[54] AIR SPRING ASSEMBLY APPARATUS AND METHOD

[75] Inventors: Richard C. Houck, Clinton; Dennis A. Lundell, Uniontown, both of Ohio

[73] Assignee: The Goodyear Tire & Rubber Company, Akron, Ohio

[21] Appl. No.: 603,677

[22] Filed: Apr. 25, 1984

Related U.S. Application Data

[62] Division of Ser. No. 437,146, Oct. 27, 1982, Pat. No. 4,471,520.

[51] Int. Cl.³ .............................................. B21D 39/00
[52] U.S. Cl. ........................................ 29/516; 29/508
[58] Field of Search ................. 29/237, 450, 508, 516, 29/517, 788; 72/402

[56] References Cited

U.S. PATENT DOCUMENTS

| | | | |
|---|---|---|---|
| 2,926,029 | 2/1960 | St. Clair et al. | 29/508 |
| 3,330,023 | 7/1967 | Frye et al. | 29/237 |
| 3,539,207 | 11/1970 | Harris | 29/508 |
| 3,720,088 | 3/1973 | Chen et al. | 72/402 |
| 3,750,452 | 8/1973 | Frank | 72/402 |
| 3,750,453 | 8/1973 | Dryden et al. | 72/402 |
| 3,967,363 | 7/1976 | Meyer | 29/434 |
| 4,018,462 | 4/1977 | Saka | 29/508 |
| 4,034,592 | 7/1977 | Chen et al. | 29/507 |
| 4,262,408 | 4/1981 | Johnson et al. | 29/507 |

FOREIGN PATENT DOCUMENTS

| | | | |
|---|---|---|---|
| 3010488 | 3/1980 | Fed. Rep. of Germany | 29/508 |
| 2092919 | 1/1982 | United Kingdom | 29/508 |

Primary Examiner—Mark Rosenbaum
Assistant Examiner—Staven E. Nichols
Attorney, Agent, or Firm—Frederick K. Lacher; T. P. Lewandowski

[57] ABSTRACT

A chuck member holds the end fitting of the air spring and inserts the fitting in the open end of a tubular sleeve of the spring. A housing is provided for axial movement toward and away from the chuck. An annular segmental clamping member is located in an opening in the housing and the segments are moved radially inward for positioning and crimping a ring member of the spring in response to controlled axial movement of the housing. Axial movement of the segments for positioning the ring member and inserting the end fitting may be provided by piston and cylinder assemblies. A crimping chamber in the housing is utilized to move the housing and actuate cam means engageable with the segments to provide the desired radial force which is applied by the segments during positioning and crimping of the ring member.

4 Claims, 8 Drawing Figures

AIR SPRING ASSEMBLY APPARATUS AND METHOD

This is a division of application Ser. No. 437,146 filed Oct. 27, 1982, now U.S. Pat. No. 4,471,520.

This invention relates generally, as indicated, to the assembly of air springs and particularly to the insertion of an end fitting in one end of a tubular sleeve member, positioning and crimping a ring member around the tubular member and over the end fitting. Still more particularly the invention relates to a method and apparatus which is precise and fast in operation and is adaptable for automatic operation.

According to one aspect of the invention there is provided a method of assembling a tubular member with an end fitting inserted in an open end of the tubular member and held in place by crimping a ring member around one end of the tubular member over said fitting comprising placing said ring member over the end of said tubular member, inserting said end fitting into the open end of said tubular member, contracting segments of an annular segmental clamping member to positions on the surface of said tubular member for clamping engagement with said ring member, increasing the clamping force exerted by said clamping member to crimp said ring member and thereafter radially expanding said segments out of contact with said ring member.

According to another aspect of the invention there is provided an apparatus for radially compressing an article comprising a housing having an opening, an annular segmental clamping member located within said opening in the assembled condition and having a series of segments spaced around an axis and movable radially into compressing engagement with the article, each of said segments being attached to a finger member positioned in said opening and pivotally mounted on a supporting member for swinging movement between a contracted assembled position of said segmental member and an expanded position spaced outwardly from said assembled position, means for moving said housing in an axial direction, means interposed between each said finger member and said housing for swinging said finger member and the attached segment radially inwardly toward the assembled position of said segmental member in response to movement of said housing in a first axial direction toward a front end of said apparatus for contracting the segments into compressing engagement with the article and means connected to each said finger member for swinging the segments outwardly away from the assembled position of said segmental member in response to movement of said housing in a second axial direction opposite to said first axial direction for expanding the segments after radial compression of the article.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

Figure 1:
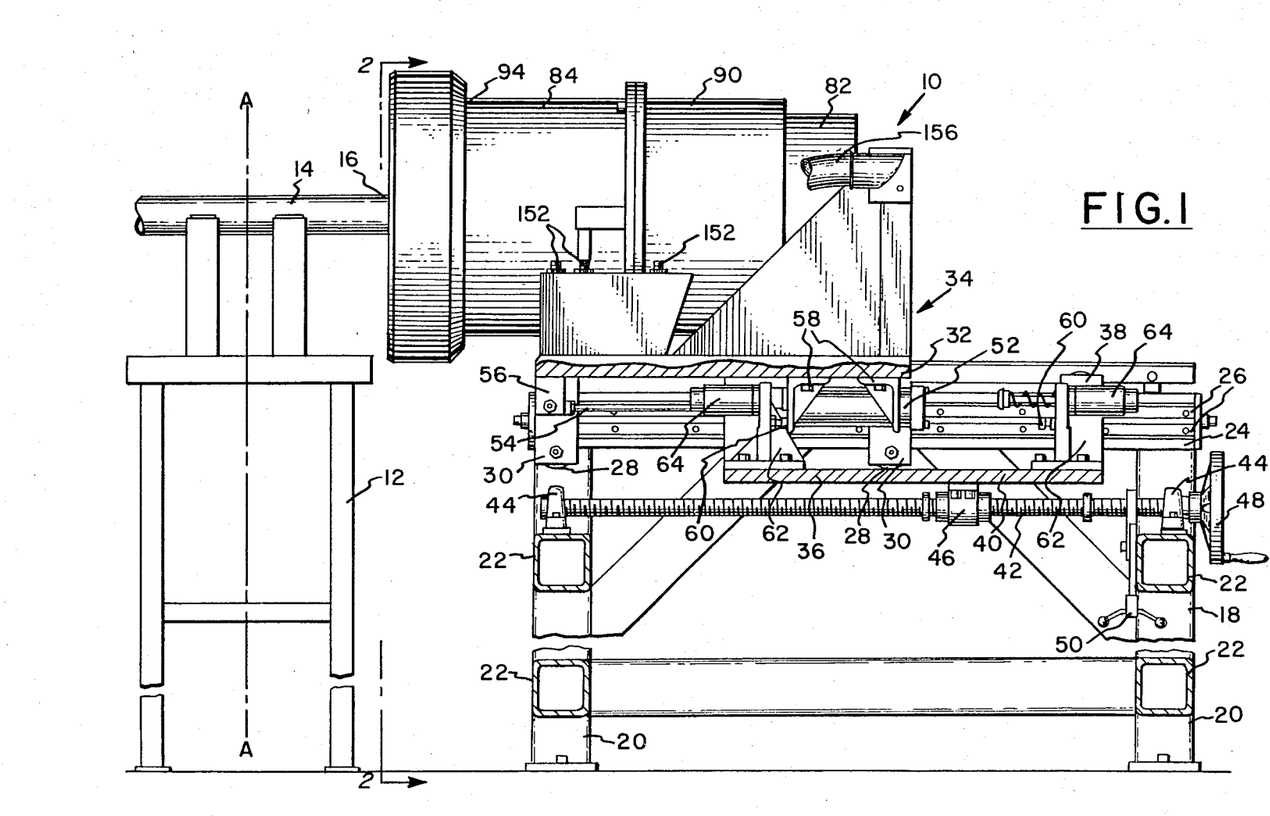
FIG. 1 is a side elevation of the apparatus embodying the invention with parts being broken away.
Figure 2:
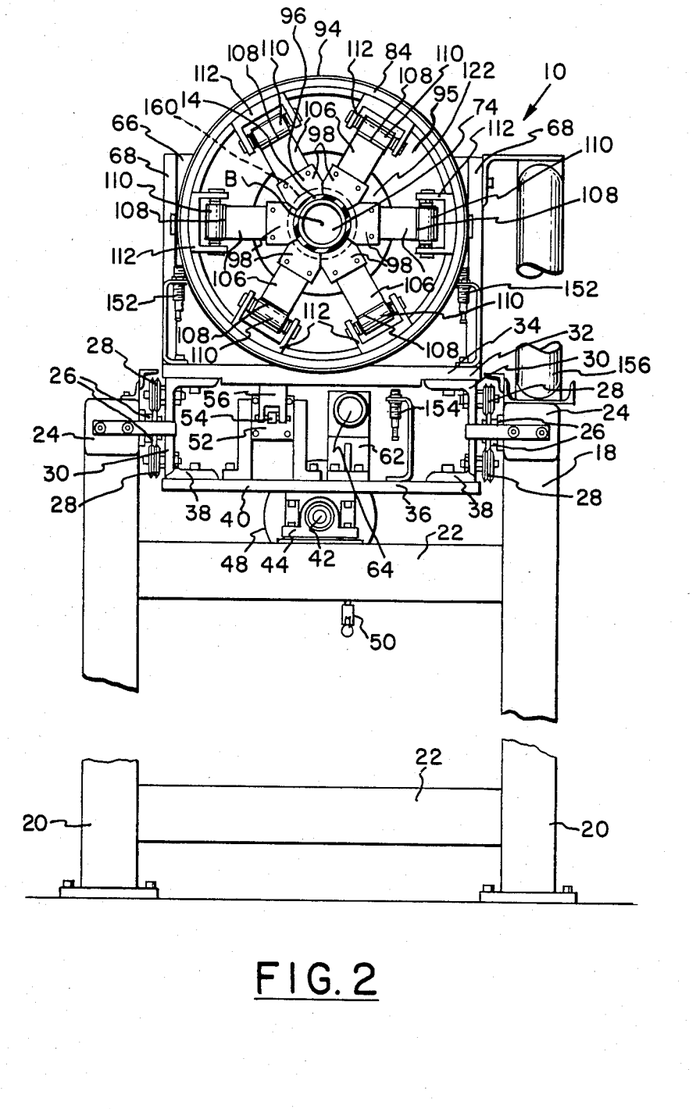
FIG. 2 is an end view taken along the line 2—2 of FIG. 1 with parts being broken away.

Referring to FIGS. 1 and 2, an air spring assembly apparatus 10 is shown positioned with a front end at one side of a stand 12 for supporting a cylindrical tubular member such as an air spring sleeve 14 of reinforced rubberlike material. The apparatus 10, shown and described hereinafter, is for processing one end 16 of the sleeve 14 and an identical apparatus may be positioned at the other end (not shown) of the air spring sleeve for processing that end in a manner similar to that described for the end 16. The apparatus for processing the other end of the air spring sleeve 14 is positioned the same distance from a center plane A—A of the stand 12 as the apparatus 10 shown in FIGS. 1, 2 and 3.

The air spring assembly apparatus 10 has a main frame 18 with legs 20 connected by horizontal end members 22 and horizontal side members 24. Tracks 26 are mounted on the inside of the upper side members 24 for supporting and guiding rollers 28 rotatably mounted on side supports 30 extending downwardly from a base member 32 of a spindle base 34. The spindle base 34 is movable toward the front of the apparatus 10 to an operating position, as shown in FIG. 1, and away from the front of the apparatus to an open position spaced from the stand 12 so that the assembled air spring may be removed from the stand and another air spring sleeve 14 placed on the stand for processing.

An intermediate frame 36 is also slidably mounted on the tracks 26 of the main frame 18 by rollers (not shown) which are rotatably mounted on side supports 38 connected to a bottom plate 40. The position of the intermediate frame 36 between the end members 22 is adjustably set by suitable means such as a screw 42 held rotatably in bearing blocks 44 mounted on end members and being threadedly engaged in a threaded sleeve 46 mounted on the bottom plate 40 of the intermediate frame. A crank 48 mounted on the end of the screw 42 may be turned to move the intermediate frame 36 along the tracks 26. A lock 50 may be provided to prevent turning of the screw 42 after the position of the intermediate frame 36 has been set.

A piston and cylinder assembly 52 is mounted on the bottom plate 40 of the intermediate frame 36 and has a piston rod 54 connected to a bracket 56 fastened to the base member 32 of the spindle base 34 for moving the spindle base along the tracks 26. The distance the spindle base 34 is moved is controlled by stop members 58 mounted on the base member 32 and engageable with stops 60 mounted on brackets 62 fastened to the bottom plate 40 of the intermediate frame 36. Shock absorbers 64 may also be mounted on the brackets 62 for engagement with the stop members 58 to cushion the stoppage of the spindle base 34.

Figure 3:
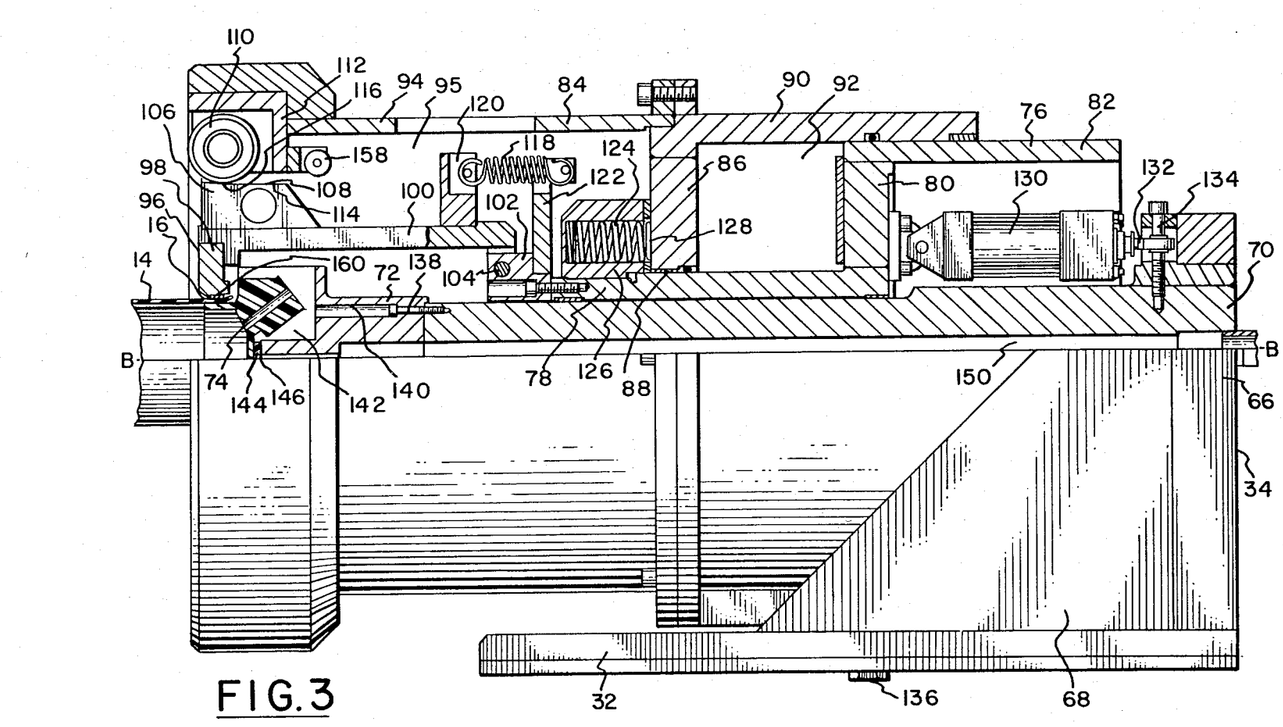
FIG. 3 is an enlarged elevation partly in section of the spindle base assembly shown in FIG. 1.

Referring to FIGS. 2 and 3, the spindle base 34 has an end member 66 and side members 68 mounted on the base member 32. A center shaft 70 is mounted on the end member 66 and extends toward the front end of the apparatus 10. A chuck 72 may be mounted on the front end of the shaft 70 for holding an end fitting 74 for insertion in the end 16 of the air spring sleeve 14 and gripping of the fitting during the assembly process.

Slidably mounted on the center shaft 70 is a finger base assembly 76 having a radially inner cylindrical member 78 positioned around the shaft. An annular piston plate 80 extends radially outward from the inner cylindrical member 78 and an outer cylindrical member 82 extends axially from the piston plate. The inner cylindrical member 78 has an inner diameter substantially the same as the outer diameter of the center shaft 70 over the positions where the finger base assembly 76 is axially movable. Radially outward of the finger base assembly 76 is a housing such as crimping drum 84 which has an annular cylinder end plate 86 with a cylindrical radially inner surface 88 slidably mounted on the outer surface of the inner cylindrical member 78 of the finger base assembly. An outer cylindrical shell 90 extends axially from the end plate 86 and is slidably mounted on the radially outer cylindrical member 82 of the finger base assembly 76 to form with the radially inner cylindrical member 78 a crimping chamber 92. The crimping chamber 92 is connected to a suitable source of air pressure and vacuum by ports in the chamber (not shown) and conduits leading to vacuum pumps and air compressors.

The shell 90 has a front extension 94 providing an opening 95 in which an annular segmental clamping member 96 is located. The segmental clamping member 96 has a series of segments 98 spaced around an axis B-B. The segments 98 are attached to finger members such as arms 100 positioned in the opening 95 and pivotally mounted on a supporting member such as the inner cylindrical member 78 which has a ring 102 with slots for receiving the ends of the arms 100 and holes through which pivot pins 104 may be inserted through the ends of the arms. The arms 100 provide for swinging movement of the segments 98 between the contracted assembled position, shown in FIGS. 2 and 3, to an expanded position spaced outwardly from the assembled position, shown in FIGS. 5 and 6. Cam members 106 are mounted on the radially outer surfaces of the arms 100 and have cam surfaces 108 engageable with cam rollers 110 rotatably supported in brackets 112 mounted on the shell front extension 94 at circumferentially spaced positions within the opening 95. As shown in FIG. 3, the cam surfaces 108 have dwell portions 114 spaced a predetermined distance from the axis B-B and clamping portions 116 spaced a greater predetermined distance from the axis.

Resilient means are provided to radially expand the segments 98 when the cam rollers 110 are moved axially away from the front end of the apparatus and in this embodiment includes coil springs 118 between blocks 120 on each of the arms 100 and an annular plate 122 fastened to the inner cylindrical member 78 of the finger base assembly 76.

During the operation of this apparatus it is desirable to limit the movement of the end plate 86 relative to the inner cylindrical member 78 and for this purpose resilient means such as springs 124 mounted in housings 126 are fastened to the inner cylindrical member of the finger base assembly 76 at spaced-apart circumferential positions and have spring ends 128 for contacting the end plate to resist the movement of the plate and maintain the cam rollers 110 in engagement with the dwell portions 114 of the cam surfaces 108.

At least one end member piston and cylinder assembly connects the annular piston plate 80 of the finger base assembly 76 and the end member 66 of the spindle base 34. In the present embodiment, two piston and cylinder assemblies 130 are positioned 180 degrees apart around the center shaft 70 with a cylinder of each of the assemblies being pivotally mounted on the piston plate 80 and a piston rod 132 of each of the assemblies being pivotally mounted on a pin 134 fastened to the end member 66. To prevent rotation of the shell 90 around the center shaft 70, a centering key 136 may be provided extending through the base member 32 into a slot or keyway in the shell.

Figure 4:
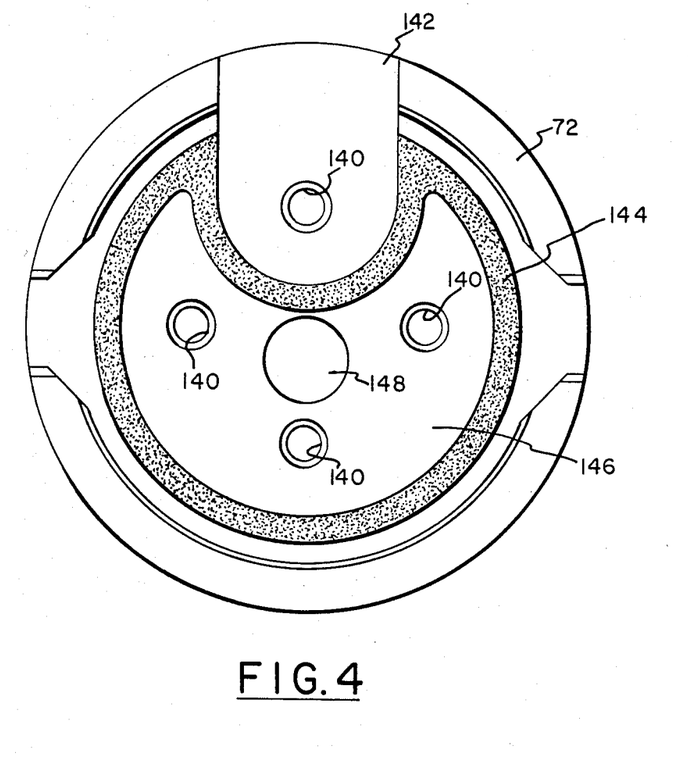
FIG. 4 is an enlarged end view of the end fitting chuck with the end fitting removed.

Referring to FIGS. 3 and 4, the chuck 72 for holding the end fitting 74 is fastened to the front end of the center shaft 70 by screws 138 extending through holes 140 in the chuck and threaded in corresponding holes in the center shaft. An opening 142 is provided for protruding parts of the end fitting 74 and a sealing gasket member 144 is provided for engagement with the flat surface of the end fitting for enclosing a space 146 between the chuck 72 and the end fitting. An aperture 148 in the chuck 72 is in communication with a passage 150 through the center shaft 70 which may be connected to a source of vacuum to hold the end fitting 74 in the chuck. With other forms of end fittings 74 the chuck 72 may have a different face so that the vacuum chamber or chambers in the space 146 conform with the flat surfaces of the end fitting 74.

As shown in FIGS. 1 and 2, proximity switches 152 may be provided on the spindle base 34 for registering the various axially spaced positions of the shell 90 of the crimping drum 84. Also frame switch means such as proximity switches 154 may be fastened to the intermediate frame 36 for indicating when the spindle base 34 is in the operating or open position. In this embodiment, the piston and cylinder assemblies 52,130 and the crimping chamber 92 are activated by air pressure which provides a faster and less expensive operation than with hydraulic actuated pistons and cylinders. The electrical, air and vacuum services for the spindle base 34 may be provided through a flexible connection 156, shown with parts broken away in FIGS. 1 and 2.

Where desirable, a failsafe expansion of the segments 98 may be obtained by rollers 158 mounted on the brackets 112 attached to the inner surface of the shell 90 in the opening 95 for engagement with the surfaces of the blocks 120 fastened to the arms 100. With this construction, the rollers 158 are positioned for engagement with the blocks 120 in the event the springs 118 do not expand the segments 98 by swinging the arms 100 radially outward.

Figure 5:
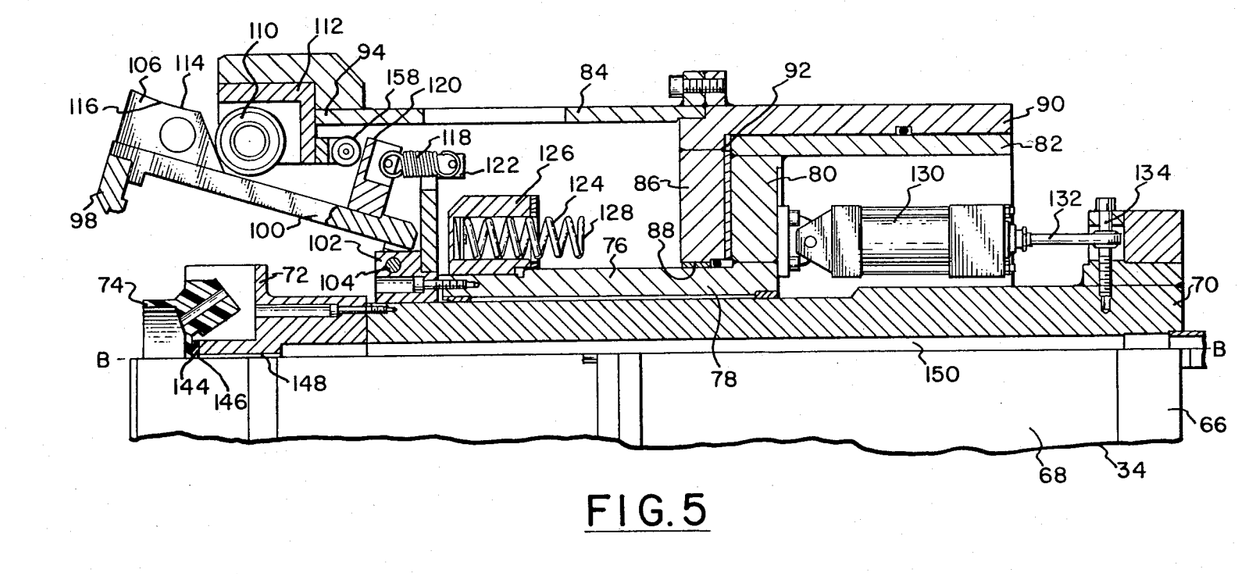
FIGS. 5, 6, 7 and 8 are elevations partly in sections like FIG. 3 showing other positions of the parts of the spindle base assembly during the assembly process.

In operation, the spindle base 34 is initially in a retracted position with the rear stop member 58 of the spindle base in contact with the rear stop 60 on the bracket 62 of the intermediate frame 36. To move the spindle base 34 from the position shown in FIG. 1 to this retracted position, the operator directs air into the piston and cylinder assembly 52 causing the piston rod 54 to move to the right as shown in FIG. 1. With the spindle base 34 in the retracted position, a vacuum is applied to the crimping chamber 92 causing the end plate 86 of the finger base assembly 76 to move to the right, as shown in FIG. 5, into a position closely adjacent the piston plate 80 of the crimping drum 84. As the crimping drum 84 moves to the right, as shown in FIG. 5, the cam rollers 110 roll off of the cam members 106 and the springs 118 cause the arms 100 to move radially outward carrying the segments 98 to an expanded position. In the event that the springs 118 do not provide sufficient force to move the arms 100 radially outward, the rollers 158 will contact the blocks 120 to insure that this radial movement does occur.

With the spindle base 34 in the retracted position and the segments 98 expanded, the end fitting 74 may be placed in the chuck 72 and a vacuum communicated to the space 146 through the passage 150 in the center shaft 70. The placing of the end fitting 74 may be done manually or with suitable automatic handling equipment.

At this time the spring sleeve 14 may be placed on the stand 12 and a ring member such as ring 160 is placed over the end 16 of the sleeve at a position which may be plus or minus 0.9 inches (2.3 centimeters) from a predetermined initial position. The ring 160 may be of aluminum or of other materials which can be crimped by radial compression. At the same time that the ring 160 is placed over the end 16 of the sleeve 14 another ring (not shown) may be placed over the other end of the sleeve for processing by a similar air spring assembly apparatus (not shown) at the opposite side of the stand 12. The apparatus also has a chuck for holding an end fitting to be inserted in the other end of the sleeve.

Figure 6:
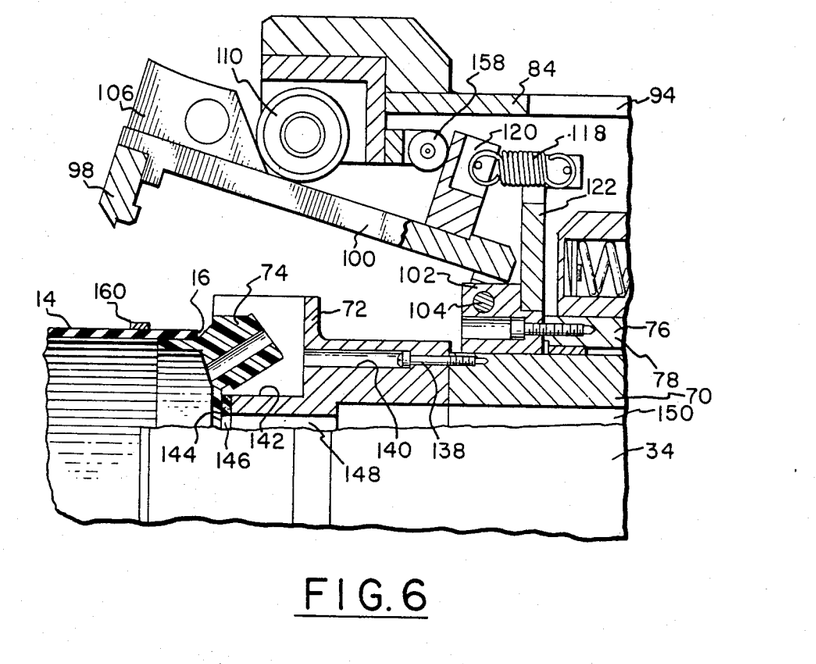

After the ring 160 has been placed over the end 16 of the sleeve 14 and the end fitting 74 placed in the chuck 72, the spindle base 34 is moved to the left, as shown in FIG. 1, to the operating position with the forward stop member 58 on the spindle base in contact with the forward stop 60 on the intermediate frame 36. During this forward movement the end fitting 74 is pushed into the open end 16 of the sleeve 14, as shown in FIG. 6. Simultaneously the chuck in the other air spring assembly apparatus 10 at the other end of the air spring sleeve 14 pushes the end fitting at that end into the open end of the sleeve so that the axial pressure at one end of the sleeve is counteracted by the axial pressure at the other end. This movement of the spindle base 34 actuates the frame proximity switch 154 indicating to the operator that this movement has occurred. The actuation of the frame proximity switch also may be used to start an automatic process for positioning and crimping the ring 160.

Figure 7:
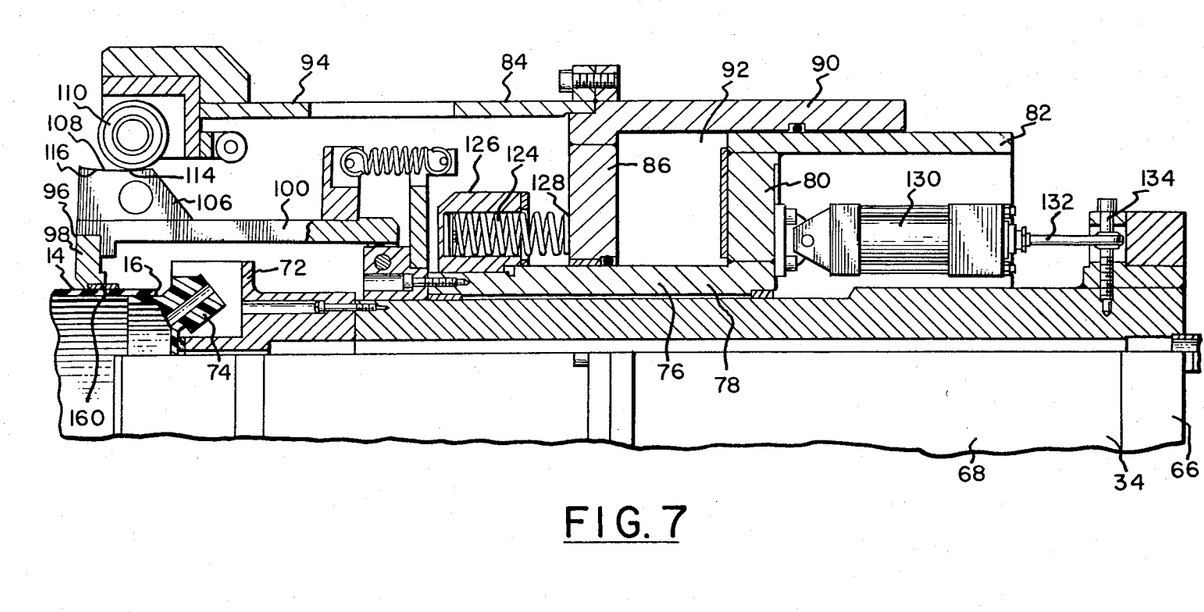

In order to position the ring 160 on the end 16 of the sleeve 14, air is admitted to the piston and cylinder assembly 130 between the end member 66 of the spindle base 34 and the piston plate 80 of the finger base assembly 76. This may be done before the end fitting 74 is positioned in the end of the sleeve 14, as shown in FIG. 5, or after the end fitting is positioned, as shown in FIG. 6. The piston rod 132 will be extended and move the finger base assembly 76 and the crimping drum 84 to the left, as shown in FIGS. 5 and 6. Then when the arms 100 are moved radially inward the segments 98 will engage the surface of the sleeve 14 at a position on the other side of the ring 160 from the end 16 of the sleeve 14, as shown in FIG. 7. The position of the spindle base 34 in FIG. 6 is indicated by one of the drum proximity switches 152 which provides a signal in the automatic process for communicating low pressure air to the crimping chamber 92 causing the end plate 86 to move to the left, as shown in FIG. 7, and engage the springs 124 which limit the movement so that the cam rollers 110 only engage the dwell portions 114 of the cam surfaces 108 and the arms 100 are moved radially inward carrying the segments 98 into loose engagement with the surface of the sleeve 14 as shown in FIG. 7. In this position the segments 98 may or may not engage the ring 160 but are in a position to engage the ring when moved to the right as shown in FIG. 7.

Figure 8:
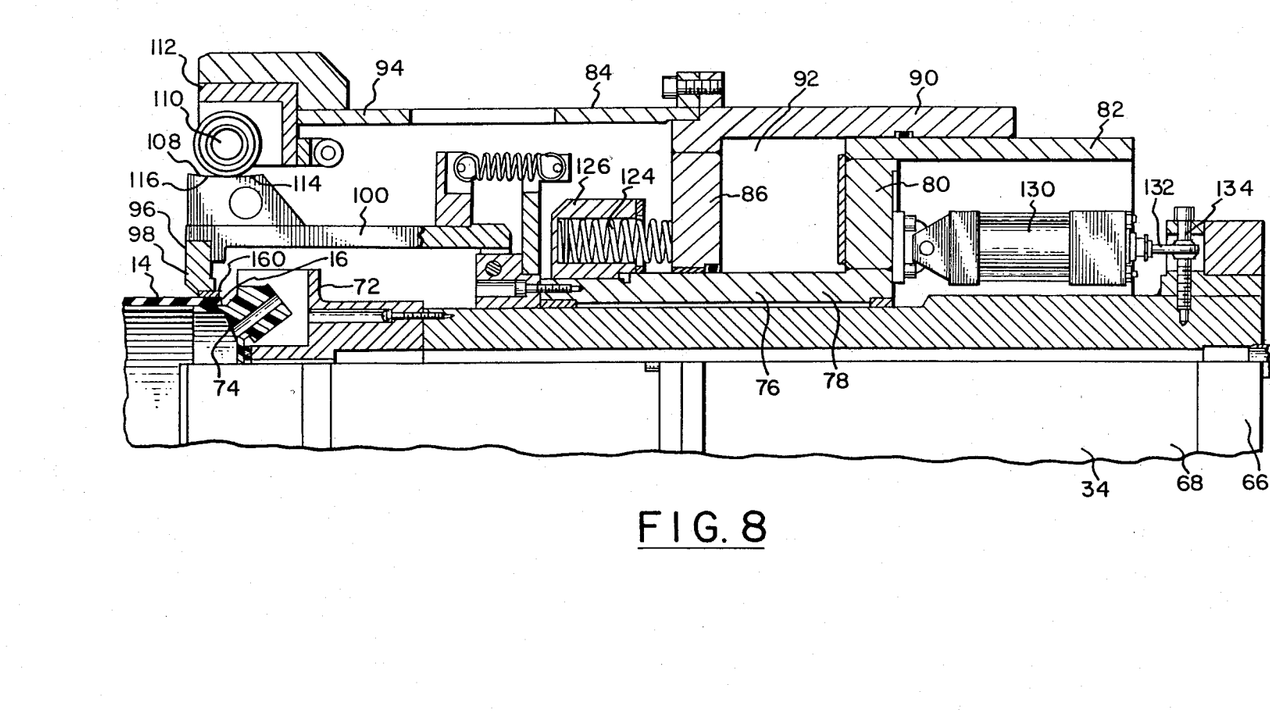

Following the radially inward movement of the arms 100 and the segments 98, which movement is indicated by one of the drum proximity switches 152, air pressure is communicated to the piston and cylinder assemblies 130 causing the piston plate 80 to move to the right toward the end member 66 of the spindle base 34 and pulling the ring 160 to the right, as shown in FIG. 7, to a predetermined final position over the end fitting 74, as shown in FIG. 8. This is done while the low pressure air of from zero to about fifteen pounds per square inch is in communication with the crimping chamber 92 so that the cam rollers 110 remain in engagement with the dwell portions 114 of the cam surfaces 108. After the segments 98 have moved the ring 160 to the predetermined final position around the end fitting 74, the position of the crimping drum 84 will be indicated by one of the drum proximity switches 152 and high pressure air may then be communicated to the crimping chamber 92. The high pressure air may be from about 50 to 150 pounds per square inch.

With the admission of the high pressure air, the end plate 86 of the crimping drum 84 will be moved to the left, as shown in FIG. 8, to the position shown in FIG. 3 with the spring 124 fully compressed and the cam rollers 110 in engagement with the clamping portions 116 of the cam surfaces 108. This causes the segments 98 to move radially inward into clamping engagement with the ring 160 causing crimping of the ring to secure the end 16 of the sleeve 14 against the end fitting 74, as shown in FIG. 3. This position of the drum is also indicated by one of the drum proximity switches 152 which may actuate the controls for automatic operation by terminating the communication of high pressure air to the crimping chamber 92 and opening the chamber to a vacuum source causing the end plate 86 to move to the right, as shown in FIG. 3, toward the piston plate 80 to the position shown in FIG. 5 with the segments 98 expanded. The position of the drum 84 shown in FIG. 3 is also indicated by one of the proximity switches 152. At the same time the vacuum is communicated to the crimping chamber 92 communication of the vacuum to the chuck 72 is discontinued.

After the segments 98 are expanded and the communication of vacuum to the chuck 72 is discontinued, air pressure is communicated to the piston and cylinder assembly 52 on the intermediate frame 36 for retracting the spindle base 34 to facilitate removal of the assembled air spring sleeve from the stand 12 manually or by other conveying equipment.

Different length air spring sleeves 14 may be assembled with this apparatus by moving the intermediate frame 36 toward the front or rear of the apparatus by turning the crank 48, as shown in FIG. 1. Also different diameter sleeves 14 with different end fittings 74 may be processed by providing different size chucks 72 and changing the segments 98 to provide a segmental clamping member 96 of a different inner diameter.

While a certain representative embodiment and details have been shown for the purpose of illustrating the invention, it will be apparent to those skilled in the art that various changes and modifications may be made therein without departing from the spirit or scope of the invention.

What is claimed is:

1. A method of assembling a tubular member with an end fitting inserted in an open end of the tubular member and held in place by crimping a ring member around the open end of the tubular member over said fitting comprising placing said ring member over the end of said tubular member, inserting said end fitting into the open end of said tubular member, contracting segments of an annular segmental clamping member to positions on the surface of said tubular member for clamping engagement with said ring member, axially moving said segments to move ring member toward end to predetermined position for crimping increasing the clamping force exerted by said clamping member to crimp said ring member and thereafter radially expanding said segments out of contact with said ring member.

2. The method of claim 1 wherein said tubular member is supported on a stationary stand member at a front end of said apparatus and said end fitting is carried by a supporting body movable axially toward said stand for inserting said end fitting in said tubular body after placing said ring member over the end of said tubular member and movable axially away from stand member after said segments are expanded radially out of contact with said ring member.

3. The method of claim 2 wherein a second end fitting is carried by a second supporting body movable simultaneously in an opposite direction from said firstmentioned supporting body toward and away from said stand member.

4. The method of claim 1 wherein said segments are initially movable radially to a position on the surface of said tubular member with an initial force providing loose engagement of said segments with said surface during axial movement of said segments to locate said ring member and then said segments are movable radially with a greater radial clamping force providing crimping of said ring member.

* * * * *